United States Patent
Shacham et al.

(10) Patent No.: US 8,472,081 B2
(45) Date of Patent: Jun. 25, 2013

(54) COLOR SCREEN SETS

(75) Inventors: Omri Shacham, Mitzpe Ramon (IL); Jan Allebach, West Lafayette, IN (US); Mani Fischer, Haifa (IL); Doron Shaked, Tivon (IL); Carl Staelin, Haifa (IL); Jin-Young Kim, SeongNam-Si (KR); Yung-Yao Chen, West Lafayette, IN (US)

(73) Assignee: Hewlett-Packard Development Company, L.P., Houston, TX (US)

(*) Notice: Subject to any disclaimer, the term of this patent is extended or adjusted under 35 U.S.C. 154(b) by 282 days.

(21) Appl. No.: 13/011,311

(22) Filed: Jan. 21, 2011

(65) Prior Publication Data

US 2012/0188611 A1    Jul. 26, 2012

(51) Int. Cl.
*H04N 1/405* (2006.01)
*H04N 1/60* (2006.01)
*H04N 1/46* (2006.01)

(52) U.S. Cl.
USPC ........... 358/3.06; 358/1.9; 358/533; 358/536; 358/3.26

(58) Field of Classification Search
USPC .................. 358/3.06, 1.9, 536, 533, 3.26
See application file for complete search history.

(56) References Cited

U.S. PATENT DOCUMENTS

| 6,633,412 B1 | 10/2003 | Lin et al. | |
|---|---|---|---|
| 2004/0109184 A1* | 6/2004 | Ishii | 358/1.9 |
| 2008/0030787 A1 | 2/2008 | McElvain | |
| 2008/0030789 A1 | 2/2008 | McElvain et al. | |
| 2008/0170280 A1 | 7/2008 | Wang et al. | |

OTHER PUBLICATIONS

Oztan et al., "Misregistration Senstivity in Clustered-dot Color Halftones", Journal of Electronic Imaging, vol. 17(2), pp. 023004-1-023004-30, Apr.-Jun. 2008.

Oztan et al., "Quantitative Evaluation of Misregistration Induced Color Shifts in Color Halftones", Color Imaging X: Processing, Hardcopy, and Applications, pp. 501-512; Proc. of SPIE-IS&T electronic Imaging, SPIE vol. 5667, 2005.

Qi et al., "A GPU-Based Algorithm for Building Stochastic Clustered-Dot Screen", G. Bebis et al. (Eds.): ISVC 2007, Part I, LNCS 4841, pp. 98-105, 2007.

* cited by examiner

*Primary Examiner* — Charlotte M Baker

(57) ABSTRACT

A method for designing a screen set for color halftoning includes selecting a screen set that includes at least two screens. The screens are applied to a uniform color image so as to form a set of corresponding colorant halftones. The colorant halftones are superposed to form a color halftone. A spatial frequency spectrum of the color halftone is calculated. Maxima of the spatial frequency spectrum that occur at two effective frequencies are identified, the two effective frequencies being located in two adjacent quadrants of a complex spatial frequency space. A magnitude of each effective frequency is compared with a predetermined frequency magnitude. The screen set is accepted for future application for color halftoning only if both effective frequency magnitudes are greater than the predetermined frequency magnitude. Relating computer program product and data processing system are also disclosed.

20 Claims, 8 Drawing Sheets

COLOR SCREEN SETS

BACKGROUND

Halftoning is a process of transforming a continuous-tone image into an image with a limited number of tone levels. Halftoning may be of use when reproducing or rendering the continuous-tone image with a printer or similar device that has a limited number of output states or levels. The result of the halftoning process is a digital image representation, which may be referred to as a halftone. The value of each pixel of the halftone represents one of the output levels. In the case of a color image, a separate colorant halftone may be generated for each rendered color. The various colorant halftones may then be superimposed to form a color halftone. The value of a pixel of each colorant halftone represents an output level for the corresponding colorant. For example, in subtractive four-color printing, the colorants may be cyan, magenta, yellow, and black.

For example, a binary digital printer may render an image with only two output levels. The binary printer may either print a dot, or not print a dot, at each printer-addressable pixel. The pixel values of the halftone determine whether or not a dot is printed at the each printer-addressable pixel. In the case of binary color printing, dots of several different colorants may be printed. Each colorant may be associated with a separate halftone. Each separate halftone may determine whether or not a dot of the corresponding colorant is printed at each printer-addressable pixel.

The objective of digital halftoning is to generate, using a limited number of output levels, a visual impression that is as close as possible to the original continuous-tone image. Such a visual impression is possible due to the relative insensitivity of the human visual system (HVS) to high spatial frequency patterns. Thus, the limited-level texture generated by the halftoning may be perceived by a human observer as a continuous-tone image. Similarly, a pattern of printed dots of various colors may be perceived by a human observer as a region with a single color. Limited-level texture for multiple colorants may be perceived by the observer as a continuous-tone color image.

A relatively computationally efficient technique for halftoning includes application of a point process, or screening. In screening, each pixel of the continuous-tone image is compared with a corresponding element of a selected threshold matrix, or screen. Results of the comparison may determine the value of the corresponding halftone pixel. In the case of binary digital printing, the value of a halftone pixel may be set at 1 when the value of the corresponding pixel of the continuous-tone image exceeds the corresponding screen threshold, and at 0 otherwise. In the case of color printing, separate colorant screens may be applied, each colorant screen corresponding to a colorant halftone for a different colorant. A value of a pixel of a colorant halftone may be set to 1 when a corresponding color component of the corresponding pixel of the continuous-tone image exceeds a threshold value of the corresponding colorant screen.

In the case of clustered-dot halftoning, the printer-addressable pixels at which a colorant is deposited to represent a given continuous-tone image level are clustered into compact structures, rather than being dispersed uniformly. In the case of periodic clustered-dot halftoning, the compact structures are arranged in a regular, periodic pattern. The periodicity of the pattern may be characterized by a lattice structure. In color periodic clustered-dot halftoning, the patterns for dots of the various colorants may differ from one another. Thus, deposition of each colorant may be characterized by a lattice structure specific to that colorant.

BRIEF DESCRIPTION OF THE DRAWINGS

Reference is made to the accompanying drawings, in which.

DETAILED DESCRIPTION

Color screen set design for periodic clustered-dot halftoning, in accordance with an embodiment of the invention, may include identifying sets of colorant screens that satisfy a set of criteria. Each colorant screen may include an array of threshold values for determining values of pixels in a colorant halftone. A color component of a pixel of a continuous-tone color image may be compared with the corresponding colorant screen. The value of the corresponding pixel of the colorant halftone may be determined by comparing the pixel component value with the corresponding threshold value of the colorant screen. A printer or other halftone image rendering device may produce a colored rendering of each colorant halftone by depositing a colorant (e.g. a colored ink or toner) on a substrate. By rendering on a single substrate all of the colorant halftones of a continuous-tone color image with their corresponding colorants, the rendered image may be perceived as a color continuous-tone image.

Each colorant screen for periodic clustered-dot color halftoning may be characterized by a colorant lattice structure. A colorant lattice structure may describe the periodicity of the corresponding colorant screen for a single colorant. In color screen design, various sets of colorant lattice structures may be evaluated. Identifying sets of colorant lattice structures that satisfy a set of criteria may result in reduction or elimination of various undesirable visible effects in a rendered color halftone. Such undesirable visible effects may include formation of perceptible moiré patterns, and perceptible effects due to misregistration of the rendering of the various colorant halftones. Evaluation criteria may be applied to calculated quantities related to a superposition of the colorant lattice structures of the set, such as effective frequencies, common periodicity, or a twist factor.

Figure 1:
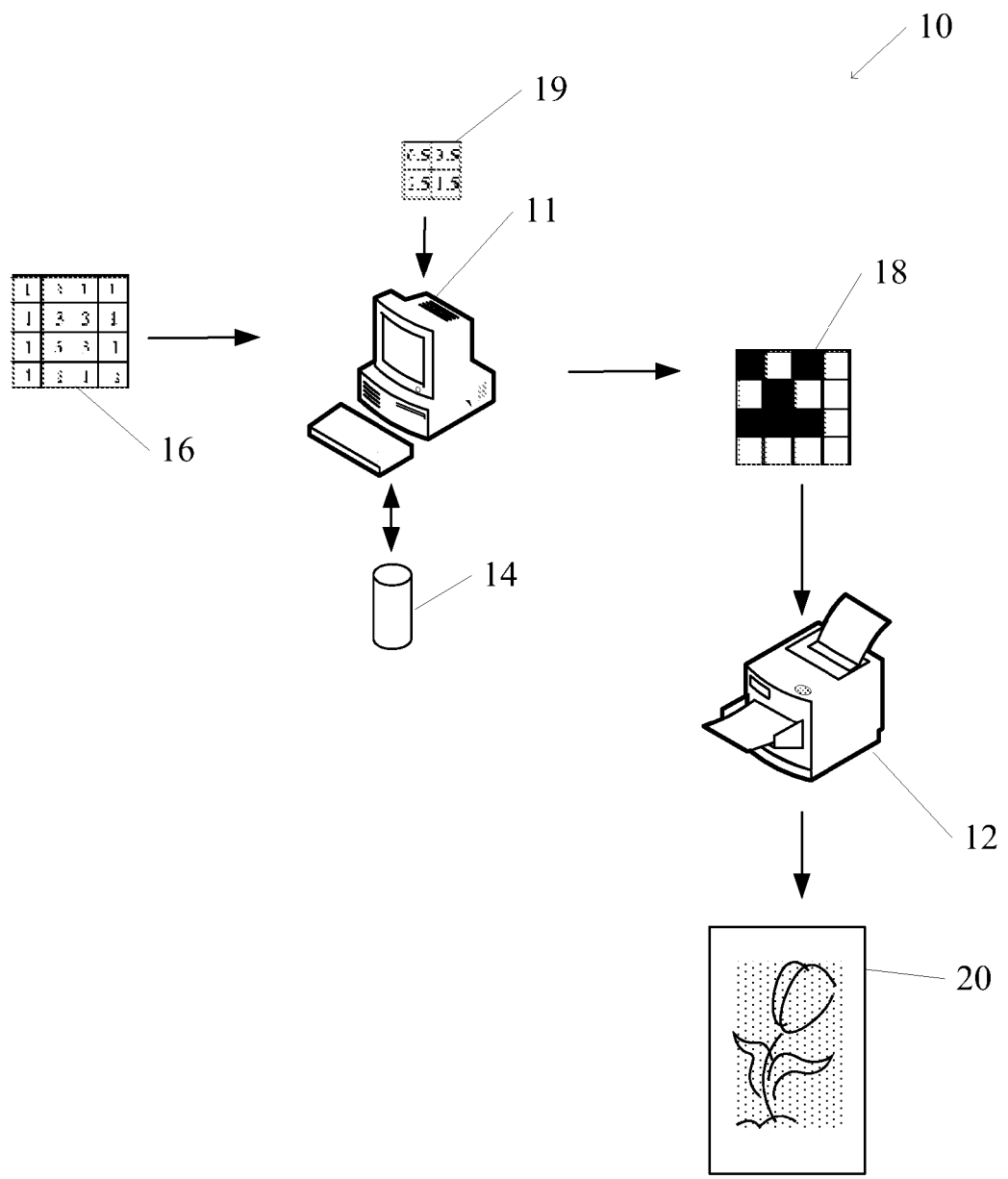
FIG. 1 schematically illustrates a system for application of color screen design in accordance with an embodiment of the invention.

FIG. 1 schematically illustrates a system for application of color screen design in accordance with an embodiment of the invention.

System 10 may include a printer 12 and an associated processor 11. For example, processor 11 may be incorporated into a computer. Printer 12 may then be configured to serve as a peripheral device of processor 11. Functionality of processor 11 may be distributed among a plurality of separate or intercommunicating processing devices. For example, some or all of the functionality of processor 11 may be incorporated into a processor that is a component of, or is associated with, printer 12.

Processor 11 may access data stored on data storage device 14. Data storage device 14 may include a plurality of data storage devices, each accessible by processor 11. Data storage device 14 may be incorporated into, or may be external to, processor 11. Data storage device 14 may include stored instructions for operation of processor 11. Data storage device 14 may be configured to store input to, and results of, various processes executed by processor 11. For example, data associated with color screen design in accordance with an embodiment of the invention may be stored on data storage device 14.

System 10 may be configured to process a color continuous tone image 16 (e.g. in the form of pixel values) to produce a color halftone 18 (e.g. in the form of binary pixel values). For example, color continuous-tone image 16 may be input from an external device (e.g. a scanner or digital camera that may communicate with processor 11), or may be stored on data storage device 14. Color halftone 18 may be generated by processor 11 by application of a colorant screen 19 (e.g. in the form of an array of threshold values) to color continuous-tone image 16. For example, in generating a binary color halftone, if a color value of a pixel of the color continuous-tone image may be compared to a threshold value for that color of the corresponding element of a colorant screen 19. If the color value of the pixel exceeds the threshold, the corresponding colorant value for the corresponding pixel of color halftone 18 may be set to 1 (a dot of colorant is to be deposited in rendering color halftone 18). Otherwise, the value may be set to 0 (no dot is to be deposited).

System 10 may be configured to render color halftone 18 in the form of rendered color halftone 20. For example, printer 12 may be configured to deposit dots of colorant on a substrate or printing medium in accordance with values of pixels of color halftone 18.

Printer 12 may include any type of color printing device known in the art for printing a color halftone image. Rendered halftone 20 may include a pattern of dots of various colorants deposited by printer 12 on a substrate such as a sheet of paper.

Figure 2A:
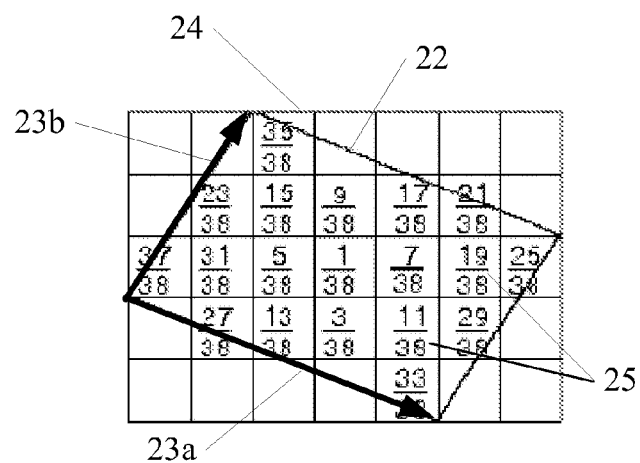
FIG. 2A schematically illustrates a representative section of a periodic colorant screen, such as a colorant screen designed in accordance with an embodiment of the invention.

FIG. 2A schematically illustrates a representative section of a periodic colorant screen, such as a colorant screen designed in accordance with an embodiment of the invention. Periodic colorant screen 24 includes an array of threshold values 25. For example, threshold values 25 may be expressed in absorptance values. An absorptance value may range from 0, indicating substantially complete absence of the corresponding colorant, to 1, indicating maximum absorptance by a colorant. A value of a pixel of a continuous-tone image may be compared with a threshold value 25 to generate a corresponding colorant halftone. If the value of the continuous-tone pixel exceeds a corresponding threshold value 25, a corresponding pixel of the colorant pixel may be set to a predetermined value (e.g. 1 for binary printing). Period 22 represents a single period of periodic colorant screen 24. Regions of colorant screen 24 that are adjacent to period 22 may contain the same arrangement and threshold values as in period 22.

Figure 2B:
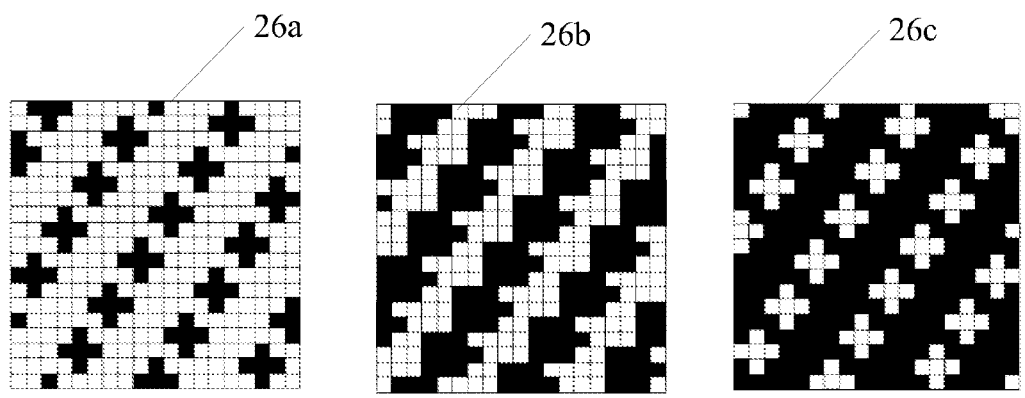
FIG. 2B illustrates application of the periodic colorant screen shown in FIG. 2A to a uniform region of a continuous-tone image.

FIG. 2B illustrates application of the periodic colorant screen shown in FIG. 2A to a uniform region of a continuous-tone image. For example, colorant halftone 26a may correspond to an absorptance level of 0.26 (equivalent to about 10/38). All pixels of colorant halftone 26a for which the corresponding threshold of colorant screen 24 is below 0.26 are filled in (representing deposition of a dot of colorant when rendering colorant halftone 26a). The filled in pixels as shown are arranged as clustered dots. Similarly, colorant halftone 26b may correspond to an absorptance level of 0.53 (equivalent to about 20/38), and colorant halftone 26c may correspond to an absorptance level of 0.74 (equivalent to about 28/38).

The periodicity of colorant screen 24 may be described in the form of a lattice structure for that colorant. Period 22 of colorant screen 24, and thus the periodicity of the lattice structure of periodic colorant screen 24, may be represented by period vectors 23a and 23b (FIG. 2A). Periodic colorant screen 24 may be constructed by copying threshold values 25 of period 22 to elements of periodic colorant screen 24 whose coordinates are indicated by integer multiples of period vectors 23a and 23b.

Alternatively, periodic colorant screen 24 may be defined by its spectrum. For example, the spectrum of periodic colorant screen 24 may be represented as a complex amplitude (or amplitude and phase) as a function of a frequency space. The spectrum may be primarily made up of discrete spatial frequency components, rather than a continuous spectrum. The spectrum may be calculated, e.g., by calculating a two-dimensional Fourier transform of the periodic colorant halftone pattern for a given highlight absorptance level, e.g. colorant halftone 26a.

Figure 2C:
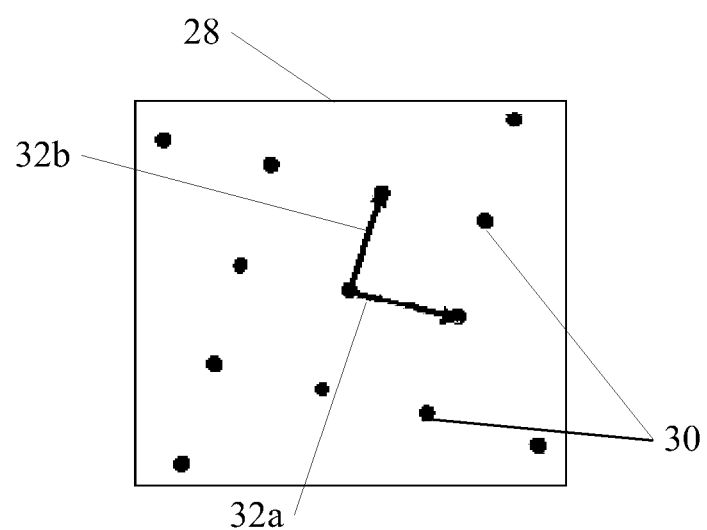
FIG. 2C shows a section of a frequency space representation of the periodic colorant screen shown in FIG. 2A.

FIG. 2C shows a section of a frequency space representation of the periodic colorant screen shown in FIG. 2A. Frequency space representation 28 may include spectral components at points 30 located at various spatial frequency coordinates, representing, e.g., horizontal and vertical spatial frequencies. Each of points 30 may be associated with a complex amplitude of a corresponding component of the spectrum. The spatial frequency coordinates of points 30 may represent various spatial frequencies present in periodic colorant screen 24. The spatial frequency coordinates of points 30 may be integer multiples of fundamental spatial frequencies represented by fundamental frequency vectors 32a and 32b. Thus, fundamental frequency vectors 32a and 32a may define a lattice structure in frequency space (a reciprocal lattice).

The lattice structure of a colorant screen for one colorant (e.g. cyan, magenta, yellow, or black for four-color printing) may be different from the lattice structure of a colorant screen for a different colorant. For example, the two lattice structures may be characterized by different period vectors and by their fundamental frequency vectors. Each of the colorant screens may be applied to the continuous-tone color image to generate a colorant halftone for the corresponding colorant.

Figure 3:
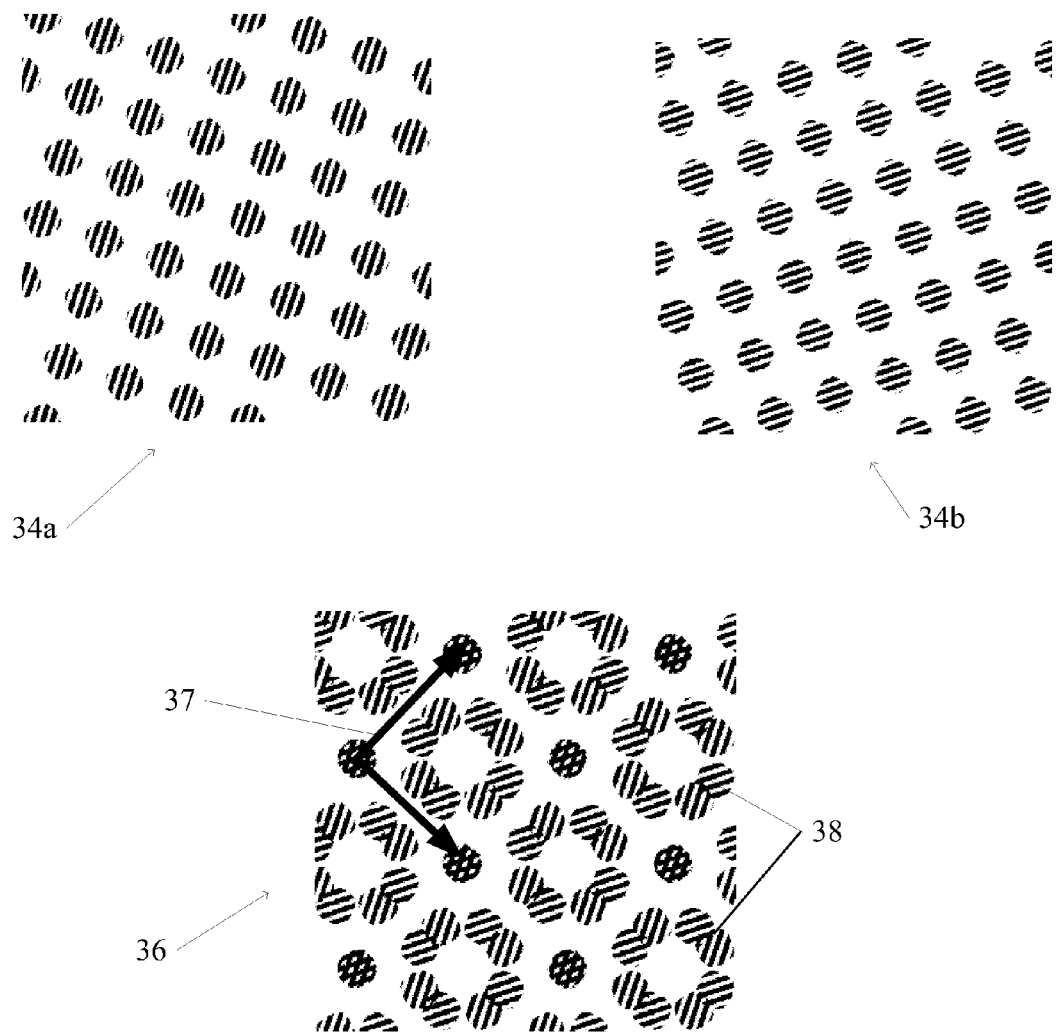
FIG. 3 illustrates superposition of two colorant halftones to form a combined color halftone.

Two or more colorant halftones may then be superposed to form a combined color halftone. FIG. 3 illustrates superposition of two colorant halftones to form a combined color halftone. Colorant halftones 34a and 34b (a section of which is shown magnified) may be combined to form combined color halftone 36. For example, the periodicity patterns of colorant halftones 34a and 34b may be rotated with respect to one another. The combination may result in rosette patterns 38. Although shown here in monochrome, colorant halftones 34a and 34b may typically be rendered with different colorants (e.g. one in cyan and the other in magenta). Thus, combined color halftone 36 would be rendered with both colorants (e.g. forming shades of blue when viewed unmagnified from a normal viewing distance by the HVS).

In a combined color halftone, a superposition of colorant halftones may introduce spatial frequencies into the spectrum that were not present in either of the spectra alone. Such introduced spatial frequencies may represent, for example, vector sums or differences between spatial frequencies present in either of the separate spectra. Thus, although the spatial frequencies present in colorant halftones 34a and 34b may be too high to be perceived by the HVS, the spatial frequencies in combined color halftone 36 may not. Low spatial frequencies introduced by combining the higher spatial frequencies may be perceptible by the HVS.

For example, the low spatial frequencies may be perceptible as a moiré pattern. Perceptible moiré structure may be introduced when, e.g., two lattice structures differ in periodicity by a small amount. Such a small difference may result in gradual spatial changes in relative spacing between pixels of the resulting combined color halftone (analogous to the formation of beats by waves of similar frequencies). The resulting pattern of gradual (low spatial frequency) variations may be perceptible to the HVS as a series of regularly spaced bands or "waves" in the appearance of the rendered image.

Figure 4:
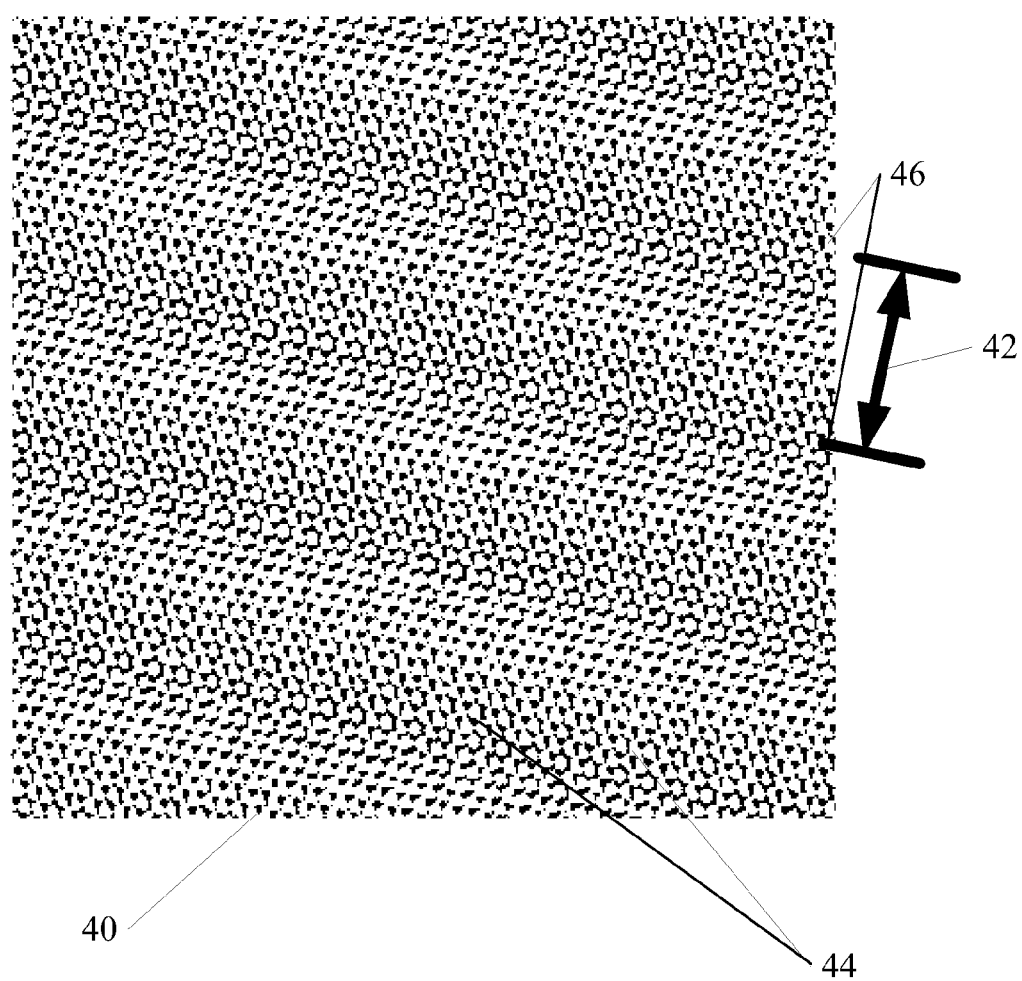
FIG. 4 illustrates a low spatial frequency moiré pattern formed by combination of higher spatial frequencies.

FIG. 4 illustrates a low spatial frequency moiré pattern formed by combination of higher spatial frequencies. Combined color halftone 40 (a section of which is shown magnified such that the presence of the pixel structure is visible) includes high spatial frequency structure 44 (e.g. forming rosettes). However, a lower frequency spatial frequency forms moiré pattern 46, whose period is indicated by length 42. A method for color screen design, in accordance with an embodiment of the invention, may reduce the incidence of moiré in a combined color halftone by selection of screen lattice structures for which the possibility of moiré is minimized.

In some types of printers, there may be a slight relative translation during the printing process between the printer and a substrate on whose surface a color halftone is being rendered. For example, some types of printers (e.g. electrophotographic offset printers) render a color halftone by first depositing one colorant as needed over an entire printing area of the substrate. After the first colorant is deposited, the process is repeated for a second colorant. As a result, a small change in position of the substrate, or a failure to precisely register deposition of a second colorant with a first, may result in a misregistration between the rendered dot patterns. The extent to which the misregistration is perceptible by the HVS may depend on selection of a screen set for the different colorants. A method for color screen design, in accordance with an embodiment of the invention, may select screen lattice structures so as to minimize perceptibility of the misregistration.

Figure 5:
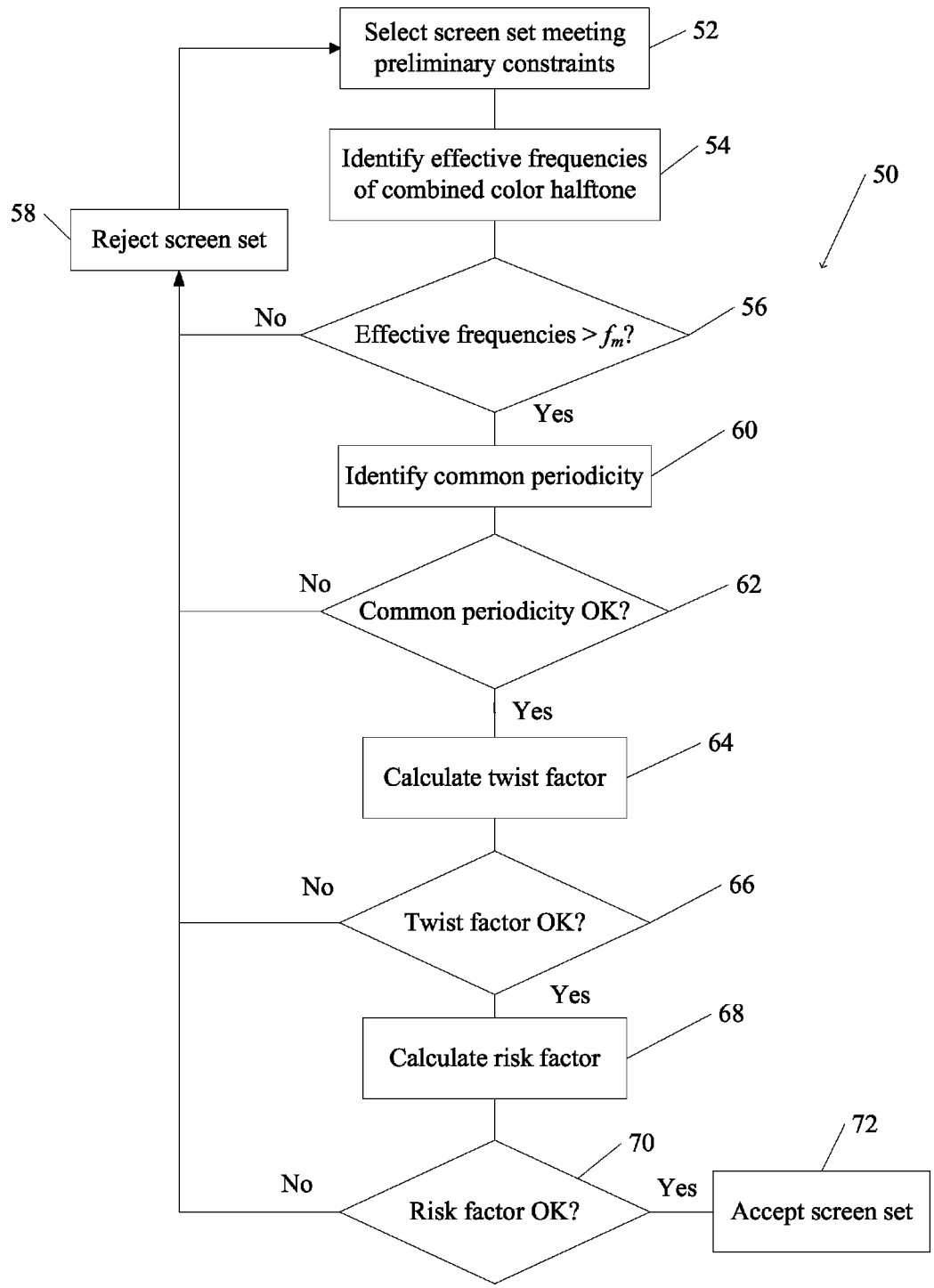
FIG. 5 is a flowchart for method 50 for color screen design, in accordance with an embodiment of the invention.

FIG. 5 is a flowchart for method 50 for color screen design, in accordance with an embodiment of the invention.

It should be understood with regard to this flowchart, and with regard to all flowcharts herein described, that the division of the method into discrete steps is for convenience and clarity only. Alternative division of the method into steps is possible with equivalent results, and all such equivalent divisions into steps should be understood as included within the scope of embodiments of the invention. The order of the steps illustrated in the flowcharts is selected for the sake of convenience and of clarity. Steps of the method may be performed concurrently or in an alternative order with equivalent results unless specifically identified otherwise. Such reordering of the steps should be understood as included within the scope of embodiments of the invention.

In particular, it should be understood that that various evaluations described in the flow chart (e.g. steps 56, 62, 66, and 68) may be performed in any order. An embodiment of the invention may include evaluating a screen set only with respect to a subset of the criteria.

Method 50 may include selecting a set of colorant screen lattice structures for the various colorants (step 52). Selection of the colorant screen lattice structures may be constrained by one or more initial constraints. For example, each individual screen lattice structure may be constrained to be compatible with the capabilities of the printer (e.g. the resolution of the printer). Due to various considerations, there may be constraints on the lattice angle (the angle between period vectors of the lattice) of each individual screen lattice structure, and on angles between period vectors of the lattice structures of the various colorant screens of the screen set. In addition, a minimum vector sum or difference between fundamental frequency vectors of the various colorant screen lattice structures may be required to be greater than a minimum value (which may eliminate screen sets that are very likely to produce moiré).

When a screen set is selected for evaluation, effective frequencies may be identified in a combined color halftone that results from application of the screen set to form colorant halftones of constant absorptance (step 54). For example, the screen set may be applied to a continuous-tone image of constant color. The constant absorptance may be selected so as to increase the perceptibility of moiré (e.g. approximately in the range of 0.2 to 0.3).

Identifying the effective frequencies may include applying micro-texture spectrum analysis to the combined color halftone. For example, micro-texture spectrum analysis may include applying a Fourier transform to the combination of the colorant halftones to calculate the spatial frequency spectrum of the combined color halftone. A low-pass filter may be applied to effectively limit the analysis to spatial frequencies that are less than a cutoff frequency $f_r$. Such a cutoff frequency $f_r$ may eliminate from the analysis any spatial frequency that is too high to be perceptible. For example, the cutoff frequency $f_r$ may be set to a value that is greater than half the maximum spatial frequency present in any of the colorant screens of the screen set, while less than a minimum spatial frequency present in any of the colorant screens. The low-pass filter may be based on an HVS model, in which case there will not be an absolute cutoff frequency $f_r$.

Identifying the effective frequencies may include identifying two linearly independent dominant frequency components in the spectrum (within the limited frequency region resulting from application of the low-pass filter). For example, such linearly independent dominant frequency components may be identified by finding two local maxima in different quadrants of the combined color halftone spectrum.

A criterion for acceptance of a screen set may include that the magnitudes (absolute values) of the identified effective frequencies of the combined color halftone spectrum be greater than a moiré cutoff frequency $f_m$ (step 56). For example, moiré cutoff frequency $f_m$ may represent a limit to the sensitivity of the HVS to moiré. If the magnitudes of both effective frequencies are not greater than $f_m$, the screen set may be rejected (step 58) and another screen set may be selected for evaluation (return to step 42). For example, a value for $f_m$ of 70 lines per inch (lpi) may be selected for two colorants.

Figure 6:
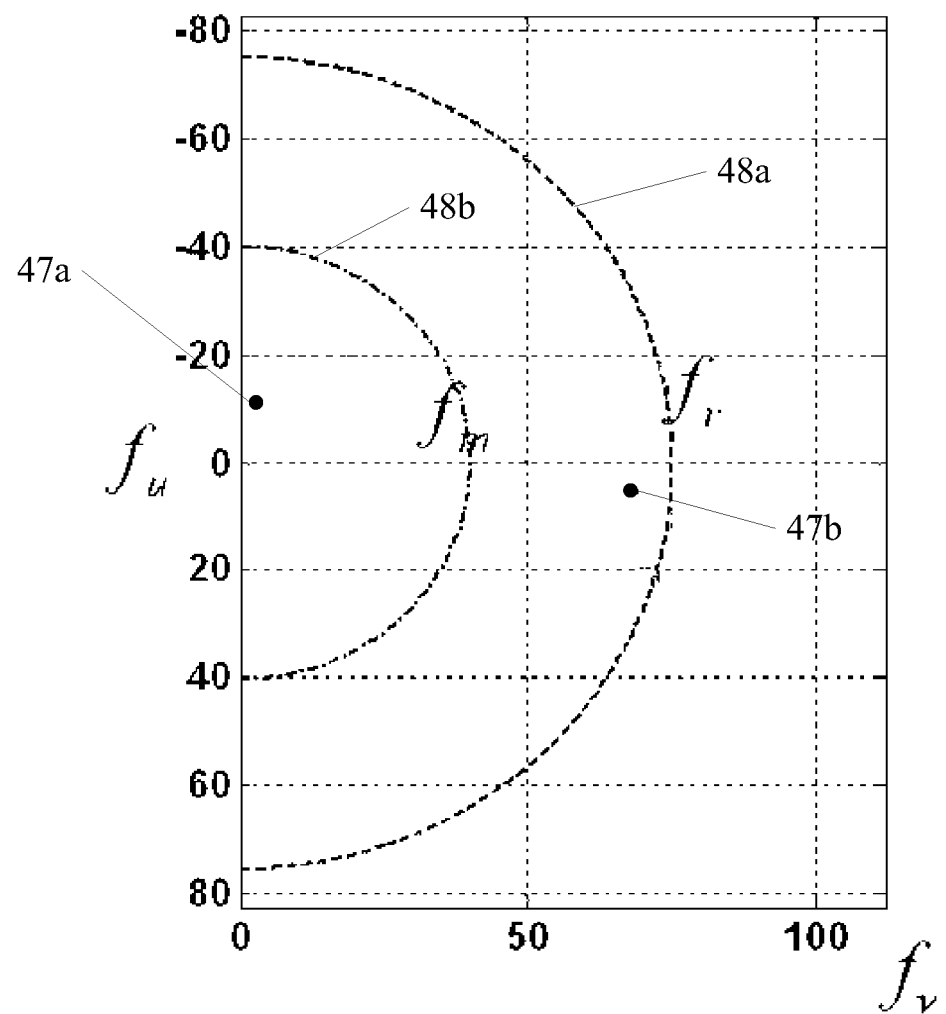
FIG. 6 illustrates identification of effective frequencies in a spatial frequency spectrum, in accordance with an embodiment of the invention.

FIG. 6 illustrates identification of effective frequencies in a spatial frequency spectrum, in accordance with an embodiment of the invention. The coordinate axes $f_u$ and $f_v$ represent orthogonal spatial frequency components. Boundary 48a may represent a limit to spatial frequencies that are less than $f_r$ (e.g. 75 lpi) imposed by application of the low-pass filter. Boundary 48b may represent an upper limit, moiré cutoff frequency $f_m$, to spatial frequencies that may be perceptible as moiré (e.g. 40 lpi). Effective frequencies 47a and 47b may represent local maxima in different quadrants of the spectrum (effective frequency 47a with $f_u > 0$ and effective frequency 47b with $f_u < 0$). Effective frequency 47a represents a spatial frequency with a magnitude less than $f_m$. Therefore, this screen set does not meet the effective frequency criterion. Application of the screen set to a continuous-tone image could yield a halftone displaying perceptible moiré, as can be seen, for example, in FIG. 4.

If (step 56 of FIG. 6) the magnitudes of the effective frequencies are greater than $f_m$, evaluation of the screen set may continue. A common periodicity for the combined color halftone may be identified (step 60). The common periodicity may be defined by a minimum common periodicity, or the smallest repetition period for the multiple-colorant pattern in the combined color halftone. For example, referring to FIG. 3, a common periodicity of combined color halftone 36 may be characterized by common period vectors 37. The common periodicity may be identified by finding the intersection of the periodicities of the colorant halftones that were combined to form the combined color halftone. A common periodicity may be quantified by the magnitudes of the common period vectors.

A large common period may imply that the patterns of the component colorant halftones rarely coincide in the same manner. In general, increasing the common period may imply increased risk of undesirable visibility of the halftone pattern. The common period may also be expressed in terms of common spatial frequency vectors. Increasing the common period will correspond to decreasing the magnitude of the common spatial frequency vectors.

The common period may be compared with a common period criterion (step 62). The comparison may include comparing a vector that characterizes the common period with an allowed range of values. This comparison may also be based on the common spatial frequency vectors. The common period criterion may include then that the magnitudes of the common spatial frequency vectors be larger than a common spatial frequency limit. For example, the common spatial frequency limit may be selected to be 30 lpi.

The common period criterion may also include comparison of the common spatial frequency vectors with the effective frequencies. If the magnitude of the common spatial frequency vectors is much less than the magnitude of the effective frequency vectors, each common period of the combined color halftone pattern will consist of many similar, but not identical, repeated rosette-like structures.

Figure 7:
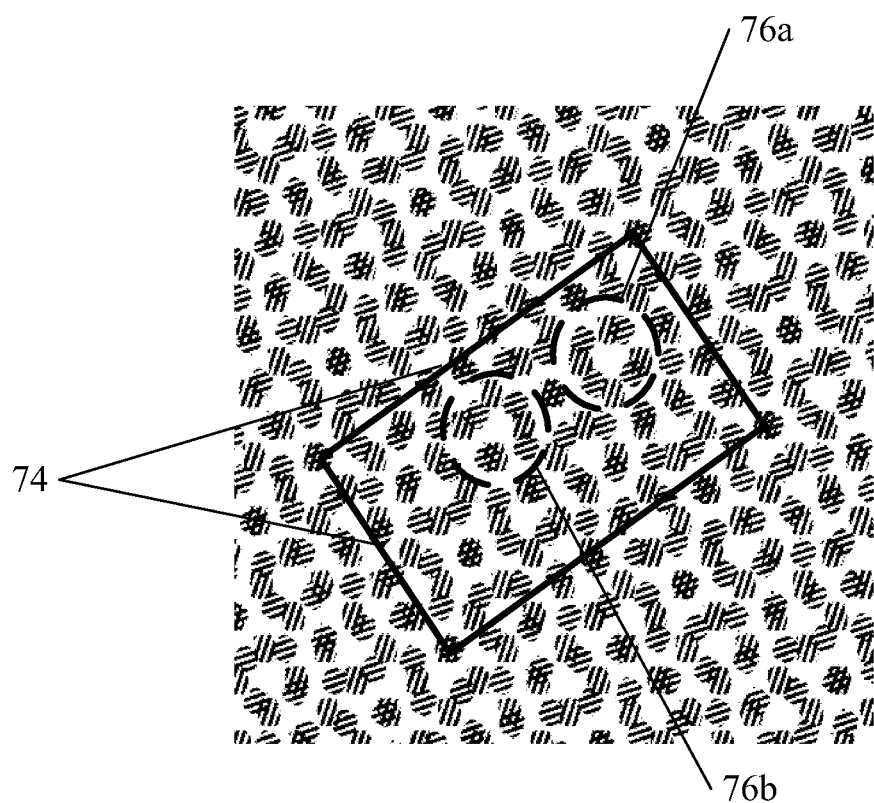
FIG. 7 illustrates comparison of a common period with an effective period, in accordance with an embodiment of the invention.

FIG. 7 illustrates comparison of a common period that is larger than an effective period, in accordance with an embodiment of the invention. The common period corresponds to the common spatial frequency vectors; and the effective period corresponds to the effective frequencies. For example, if the common spatial frequency is much smaller than an effective frequency, common period 74 may be larger than rosette patterns 76a and 76b. In this case, a single common period 74 may include several rosette patterns 76a and 76b. Rosette patterns 76a and 76b may be similar to one another but not identical as shown. The complexity introduced by rosette patterns 76a and 76b may mask or reduce the visibility of any effects of common period 74. Perceptibility of effects of a common period 74 may be reduced when the size of a common period 74 is increased relative to a rosette patterns 76a or 76b.

In addition to masking the visibility of the large common period, a large ratio of the magnitude of the common period to the magnitude of the effective period may provide greater robustness to misregistration between the colorant halftone patterns that comprise the combined color halftone pattern. Misregistration between colorant halftone patterns may cause distinctive changes in the regular rosette structure. However, when the magnitude of the common period is much larger than the magnitude of the effective period, each common period may contain many slightly different rosette structures. In this case, although misregistration between colorant halftone patterns may disturb the structure of the rosette patterns, the complex nature of these patterns may reduce the perceptibility of the change in structure. This may decrease the risk of susceptibility to any misregistration in depositing of the colorant halftones to form a combined color halftone. Such misregistration may occur, for example, when one colorant is first deposited on a region of a surface of a substrate, and a second colorant is deposited at a later time on the same region.

If the common period does not satisfy the common period criterion, the screen set may be rejected (step 58) and another screen set selected for evaluation (return to step 52). If it does satisfy the common period criterion, evaluation of the screen set may continue.

A criterion for accepting a screen set in accordance with an embodiment of the invention may include comparing the magnitudes of the two effective frequencies. When the two effective frequencies have similar magnitudes, the combined color halftone may appear to be isotropic. However, when the magnitudes of the two effective frequencies are dissimilar, a preferred directionality may be visible in the combined color halftone. Such a preferred directionality may be undesirable.

For example, a twist factor may be calculated for the combined color halftone (step 64). A twist factor for the combined color halftone may be defined as the ratio of the magnitude of the larger of the two effectHive frequencies to the magnitude of the smaller. For example, the twist factor for effective frequencies 47a and 47b (FIG. 6) would be that magnitude of effective frequency 47b divided by the magnitude of effective frequency 47a. The value of the twist factor may indicate a degree of symmetry of the microstructure of the combined color halftone.

The value of the twist factor (always greater than or equal to one) may be compared to a twist factor criterion (step 66). For example, a twist factor criterion may require that the twist factor be no more than 1.5.

If the twist factor does not satisfy the twist factor criterion, the screen set may be rejected (step 58) and another screen set may be selected for evaluation (return to step 52). If it does satisfy the twist factor criterion, evaluation of the screen set may continue.

A criterion for accepting a screen set in accordance with an embodiment of the invention may include evaluating a visual impact of misregistration of the various colorant halftones that form a combined color halftone. The visual impact may be evaluated by calculation of a risk factor (step 68).

Calculation of the risk factor may be based on calculation of a cost function $\Phi(b)$, where the vector b represents a relative displacement between colorant halftones. The cost function may indicate a visual equivalence of two combined color halftones, where in one of the combined color halftones there is a relative displacement b among colorant halftones, and in the other there is none. The cost function may be defined by the formula $\Phi(b) = 1 - \max_d[c(d)]$. In the formula, c(d) represents a correlation between a displaced combined halftone z[b] within which there was a relative displacement b among colorant halftones, and an combined halftone x[d] that represents a translation as a whole of the original combined color halftone x[0]. The term $\max_d[c(d)]$ may represent the maximum value of c(d) as the translation d is varied. For some relative displacements b, a relative displacement between colorant halftones may be similar or identical to a translated combined halftone x[d]. Therefore, taking the maximum may ensure that the cost function is calculated with respect to the most similar translated image x[d]. When so defined, the cost function $\Phi(b)$ may have values ranging from 0 (z[b] and x[d] representing identical combined color halftones) to 1 (maximally different).

Given a cost function $\Phi(b)$, a risk factor R may be calculated as $R=\max_b[\Phi(b)]$. Alternatively, the risk factor may be taken to be an average (or other representative) value of $\Phi(b)$.

The value of the risk factor may be compared to a risk factor criterion (step 70). For example, a risk factor criterion may require that the risk factor be no more than a fixed maximum value.

If the risk factor does not satisfy the risk factor criterion, the screen set may be rejected (step 58) and another screen set may be selected for evaluation (return to step 52).

If the screen set meets the risk factor criterion and all other criteria, the screen set may be accepted (step 72). The screen set may then be applied for creating a color halftone from a continuous-tone image.

Color screen design, in accordance with an embodiment of the invention, may be implemented in the for m of software, hardware or a combination thereof.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

What is claimed is:

1. A method for designing a screen set for color halftoning so as to minimize moiré effect, the method comprising:
   selecting a screen set that includes at least two screens;
   applying the screens of the screen set to a uniform color image so as to form a set of corresponding colorant halftones and superposing the colorant halftones to form a color halftone;
   calculating a spatial frequency spectrum of the color halftone;
   identifying two maxima of the spatial frequency spectrum that occur at two effective frequencies, the two effective frequencies being located in two adjacent quadrants of a complex spatial frequency space;
   comparing a magnitude of each effective frequency with a predetermined frequency magnitude;
   accepting the screen set for future application for color halftoning only if both effective frequency magnitudes are greater than the predetermined frequency magnitude.

2. The method of claim 1, wherein calculating the spatial frequency spectrum comprises applying a low-pass spatial frequency filter to the spectrum based on a model for the human visual system.

3. The method of claim 1, further comprising identifying a vector characterizing a common periodicity of the color halftone, and accepting the screen set for future application for color halftoning only if the magnitude of the vector is within a predetermined range.

4. The method of claim 3, wherein the vector is a common spatial frequency vector and the predetermined range includes magnitudes that are greater than a common spatial frequency limit.

5. The method of claim 3, wherein the predetermined range is dependent on the effective frequency.

6. The method of claim 1, further comprising calculating a ratio of the magnitude of one of the effective frequencies to the magnitude of the other effective frequency, and accepting the screen set for future application for color halftoning only if the magnitude of the ratio is within a predetermined range of ratios.

7. The method of claim 1, further comprising calculating a risk factor that is indicative of a susceptibility of the screen set to colorant halftone misregistration, and accepting the screen set for future application for color halftoning only if the magnitude of the risk factor is within a predetermined range of risk factors.

8. The method of claim 1, wherein selecting the screen set comprises selecting the screen set in accordance with a constraint selected from a list of constraints that consists of: compatibility with a printer resolution, a lattice angle characterizing a screen of said at least two screens, and an angle between vectors that characterize the periodicities of two of said at least two screens.

9. A non-transitory computer readable medium containing instructions that when executed cause a processor to execute the steps of:
   applying the screens of the screen set to a uniform color image so as to form a set of corresponding colorant halftones and superposing the colorant halftones to form a color halftone;
   calculating a spatial frequency spectrum of the color halftone;
   identifying two maxima of the spatial frequency spectrum that occur at two effective frequencies, the two effective frequencies being located in two adjacent quadrants of a complex spatial frequency space;
   comparing a magnitude of each effective frequency with a predetermined frequency magnitude;
   accepting the screen set for future application for color halftoning only if both effective frequency magnitudes are greater than the predetermined frequency magnitude.

10. The non-transitory computer readable medium of claim 9, wherein calculating the spatial frequency spectrum comprises applying a low-pass spatial frequency filter to the spectrum based on a model for the human visual system.

11. The non-transitory computer readable medium of claim 9, further containing instructions for identifying a vector characterizing a common periodicity of the color halftone, and accepting the screen set for future application for color halftoning only if the magnitude of the vector is within a predetermined range.

12. The non-transitory computer readable medium of claim 11, wherein the vector is a common spatial frequency vector and the predetermined range includes magnitudes that are greater than a common spatial frequency limit.

13. The non-transitory computer readable medium of claim 11, wherein the predetermined range is dependent on the effective frequency.

14. The non-transitory computer readable medium of claim 9, further containing instructions for calculating a ratio of the magnitude of one of the effective frequencies to the magnitude of the other, and accepting the screen set for future application for color halftoning only if the magnitude of the ratio is within a predetermined range of ratios.

15. The non-transitory computer readable medium of claim 9, further comprising calculating a risk factor that is indicative of a susceptibility of the screen set to colorant halftone misregistration, and accepting the screen set for future application for color halftoning only if the magnitude of the risk factor is within a predetermined range of risk factors.

16. The non-transitory computer readable medium of claim 9, wherein selecting the screen set comprises selecting the screen set in accordance with a constraint selected from a list of constraints that consists of: compatibility with a printer resolution, a lattice angle characterizing a screen of said at least two screens, and an angle between vectors that characterize the periodicities of two of said at least two screens.

17. A data processing system comprising:
a processing unit in communication with a non-transitory computer usable medium, wherein the non-transitory computer usable medium contains a set of instructions for generating a clustered halftone representation of a continuous-tone image for printing, wherein the processing unit is designed to carry out the set of instructions to:
select a screen set that includes at least two screens;
apply the screens of the screen set to a uniform color image so as to form a set of corresponding colorant halftones and superpose the colorant halftones to form a color halftone;
calculate a spatial frequency spectrum of the color halftone;
identify two maxima of the spatial frequency spectrum that occur at two effective frequencies, the two effective frequencies being located in two adjacent quadrants of a complex spatial frequency space;
compare a magnitude of each effective frequency with a predetermined frequency magnitude;
accept the screen set for future application for color halftoning only if both effective frequency magnitudes are greater than the predetermined frequency magnitude.

18. The system of claim 17, wherein the processing unit is designed to carry out instructions to identify a vector characterizing a common periodicity of the color halftone, and accept the screen set for future application for color halftoning only if the magnitude of the vector is within a predetermined range.

19. The system of claim 17, wherein the processing unit is designed to carry out instructions to calculate a ratio of the magnitude of one of the effective frequencies to the magnitude of the other, and accept the screen set for future application for color halftoning only if the magnitude of the ratio is within a predetermined range of ratios.

20. The system of claim 18, wherein the processing unit is designed to carry out instructions to calculate a risk factor that is indicative of a susceptibility of the screen set to colorant halftone misregistration, and accept the screen set for future application for color halftoning only if the magnitude of the risk factor is within a predetermined range of risk factors.

* * * * *